(12) United States Patent
Nhep (10) Patent No.: US 8,929,707 B2
(45) Date of Patent: Jan. 6, 2015

(54) MULTI-PORT ADAPTER BLOCK

(71) Applicant: ADC Telecommunications, Inc., Eden Prairie, MN (US)

(72) Inventor: Ponharith Nhep, Savage, MN (US)

(73) Assignee: ADC Telecommunications, Inc., Berwyn, PA (US)

( * ) Notice: Subject to any disclaimer, the term of this patent is extended or adjusted under 35 U.S.C. 154(b) by 0 days.

(21) Appl. No.: 13/622,082

(22) Filed: Sep. 18, 2012

(65) Prior Publication Data

US 2013/0071084 A1 Mar. 21, 2013

Related U.S. Application Data

(63) Continuation of application No. 12/380,976, filed on Mar. 4, 2009, now Pat. No. 8,270,796.

(60) Provisional application No. 61/068,008, filed on Mar. 4, 2008.

(51) Int. Cl.
*G02B 6/38* (2006.01)
*H05K 7/14* (2006.01)
*G02B 6/00* (2006.01)

(52) U.S. Cl.
CPC ............ *G02B 6/00* (2013.01); *G02B 6/3825* (2013.01); *G02B 6/3849* (2013.01); *G02B 6/3897* (2013.01)
USPC ........................................... 385/135; 385/17

(58) Field of Classification Search
CPC ............. G02B 6/38; G02B 6/00; G02B 6/36; G02B 6/46; G02B 6/26
USPC ..................................................... 385/135, 17
See application file for complete search history.

(56) References Cited

U.S. PATENT DOCUMENTS

| 5,028,801 | A | * | 7/1991 | Gerdt ...................... 250/227.12 |
| 5,599,206 | A | * | 2/1997 | Slack et al. ................... 439/536 |
| 5,987,203 | A | * | 11/1999 | Abel et al. ....................... 385/51 |
| 6,062,893 | A | * | 5/2000 | Miskin et al. ................. 439/374 |
| 6,267,606 | B1 | * | 7/2001 | Poplawski et al. .............. 439/92 |
| 6,273,752 | B1 | * | 8/2001 | Martin et al. .............. 439/540.1 |
| 6,461,052 | B1 | * | 10/2002 | Hines et al. ..................... 385/53 |
| 7,218,827 | B2 | | 5/2007 | Vongseng et al. |
| 7,277,620 | B2 | | 10/2007 | Vongseng et al. |
| 7,323,677 | B1 | * | 1/2008 | Wang ...................... 250/227.14 |
| 7,416,349 | B2 | | 8/2008 | Kramer |
| 7,422,376 | B2 | * | 9/2008 | Chen et al. ...................... 385/78 |
| 7,515,805 | B2 | | 4/2009 | Vongseng et al. |
| 7,519,259 | B2 | | 4/2009 | Smith et al. |
| 7,809,233 | B2 | | 10/2010 | Smith et al. |
| 7,809,234 | B2 | * | 10/2010 | Smith et al. .................. 385/135 |
| 7,826,706 | B2 | | 11/2010 | Vongseng et al. |
| 7,853,112 | B2 | * | 12/2010 | Zimmel et al. ................ 385/135 |
| 8,270,796 | B2 | | 9/2012 | Nhep |
| 2003/0095263 | A1 | * | 5/2003 | Varshneya et al. ............ 356/477 |

(Continued)

*Primary Examiner* — Kaveh Kianni
(74) *Attorney, Agent, or Firm* — Merchant & Gould P.C.

(57) ABSTRACT

An adapter block constructed to mount to more than one mounting configuration of a telecommunications panel. The adapter block including a housing constructed to slide mount to a panel, and pivot mount to a panel from either a front or a rear of the panel. The housing including flexible levers that provide a snap-fit connection to secure the adapter block relative to the panel in each of the mounting configurations. The adapter block providing access to cable terminations of the block in each of the mounting configurations.

13 Claims, 12 Drawing Sheets

(56) References Cited

U.S. PATENT DOCUMENTS

| | | | |
|---|---|---|---|
| 2004/0017983 A1* | 1/2004 | Chen et al. | 385/78 |
| 2005/0083670 A1* | 4/2005 | Peloza | 361/801 |
| 2005/0135768 A1* | 6/2005 | Rapp et al. | 385/135 |
| 2005/0232566 A1* | 10/2005 | Rapp et al. | 385/135 |
| 2005/0281509 A1* | 12/2005 | Cox et al. | 385/59 |
| 2005/0281526 A1* | 12/2005 | Vongseng et al. | 385/135 |
| 2006/0029353 A1* | 2/2006 | Bolster et al. | 385/135 |
| 2006/0228086 A1* | 10/2006 | Holmberg et al. | 385/135 |
| 2009/0190896 A1* | 7/2009 | Smith et al. | 385/135 |
| 2009/0202214 A1* | 8/2009 | Holmberg et al. | 385/135 |
| 2010/0008635 A1* | 1/2010 | Zimmel | 385/135 |
| 2010/0054935 A1* | 3/2010 | Olesen | 416/1 |
| 2010/0081303 A1* | 4/2010 | Roth et al. | 439/140 |
| 2010/0129028 A1* | 5/2010 | Nhep et al. | 385/24 |
| 2010/0158464 A1* | 6/2010 | Zimmel et al. | 385/135 |
| 2010/0266237 A1* | 10/2010 | Holmberg et al. | 385/24 |
| 2010/0322577 A1* | 12/2010 | Bolster et al. | 385/135 |
| 2011/0019964 A1* | 1/2011 | Nhep et al. | 385/135 |
| 2011/0019965 A1* | 1/2011 | Smith et al. | 385/135 |
| 2011/0092100 A1* | 4/2011 | Coffey et al. | 439/620.22 |
| 2011/0115494 A1* | 5/2011 | Taylor et al. | 324/537 |
| 2011/0116748 A1* | 5/2011 | Smrha et al. | 385/76 |
| 2011/0222830 A1* | 9/2011 | Zimmel | 385/135 |

* cited by examiner

MULTI-PORT ADAPTER BLOCK

CROSS-REFERENCE TO RELATED APPLICATIONS

This application is a continuation of application Ser. No. 12/380,976, filed Mar. 4, 2009, now U.S. Pat. No. 8,270,796, which application claims the benefit of provisional application Ser. No. 61/068,008, filed Mar. 4, 2008, which applications are incorporated herein by reference in their entirety.

FIELD OF THE INVENTION

The present disclosure relates generally to devices for use in the telecommunications industry, and various methods associated with such devices. More particularly, this disclosure relates to adapter block arrangements for use in fiber optic applications, and various methods associated with adapter block arrangements.

BACKGROUND OF THE INVENTION

In the telecommunications industry, high-density adapter blocks are used to accommodate the demand for increased fiber optic transmissions. The adapter blocks are typically mounted to a panel fixture. The adapter blocks generally include a number of adapters to which fiber optic cables are terminated. Cable management of such systems requires accessibility to the cable fiber terminations at the adapters. To facilitate accessibility, some panel fixtures and adapter blocks have a slide mount that allows a technician to slide an adapter block away from the other blocks for access to the densely packed terminations of the adapter block. Other panel fixtures and adapter blocks have a threaded fastener mount that allows a technician to remove an adapter block from the panel fixture for access. Further development in such fiber termination arrangements is desired.

SUMMARY OF THE INVENTION

One aspect of the present invention relates to a selectively accessible adapter block that is mountable to more than one mounting configuration of a telecommunications panel. That is, the adapter block can be used in different telecommunication applications while still providing access to the cable terminations of the block in each of the different applications. For example, the present adapter block can slide mount to one panel, and pivot mount to another panel from either the front or the rear of the panel. In each of the slide mount, front pivot mount, and rear pivot mount applications, the adapter block snap-fits to the panel. Also, in each panel application, the adapter block provides access to the cable terminations of the block.

A variety of examples of desirable product features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

Figure 1:
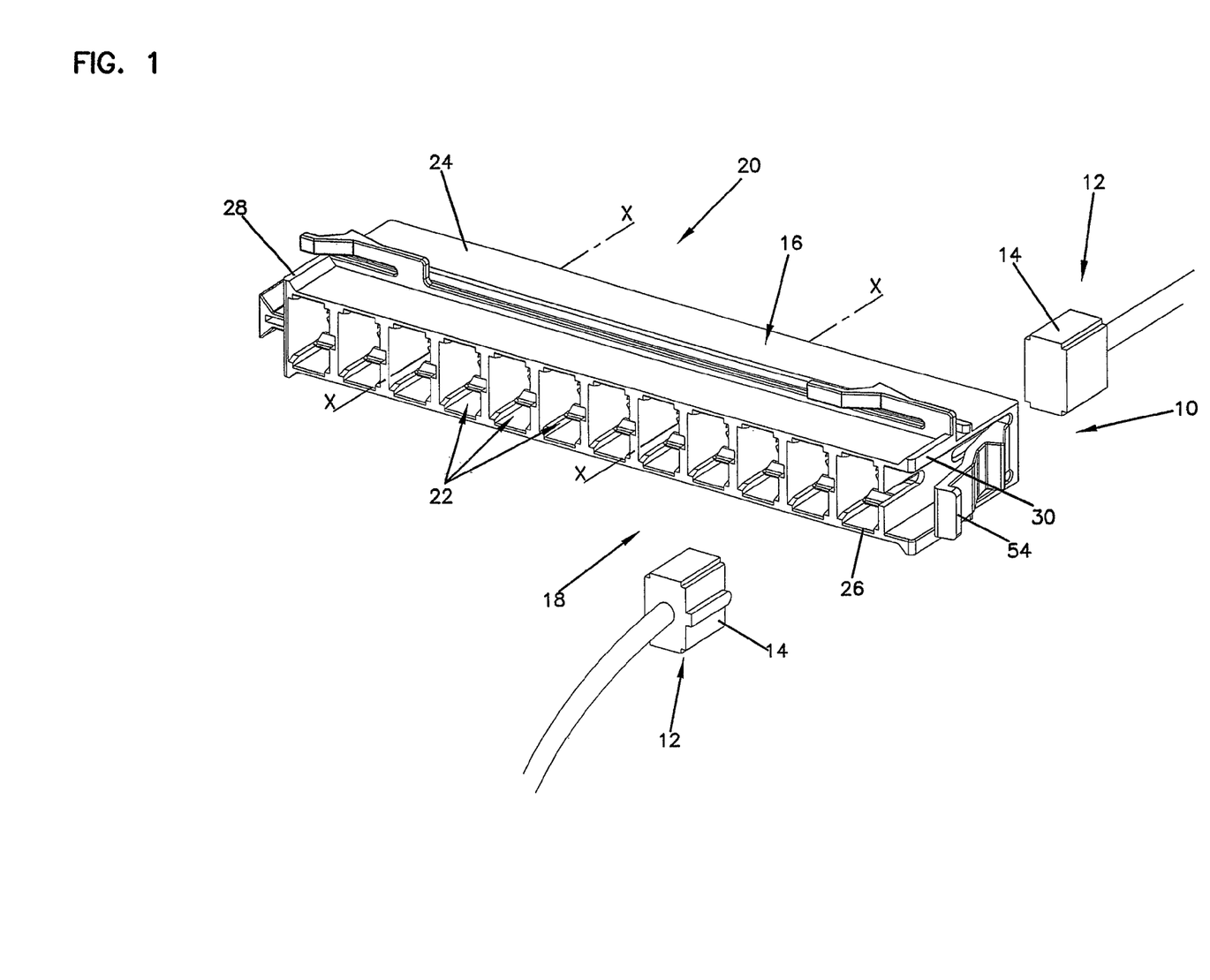
FIG. 1 is a front perspective view of one embodiment of a multi-port adapter block, in accordance with the principles disclosed.

FIG. 1 illustrates one embodiment of a multi-port adapter block 10 in accordance with the principles disclosed. The adapter block 10 is designed for use in the telecommunications industry. The adapter block is arranged to provide interconnection between two connectorized fiber optic cables 12 (schematically represented). What is meant by connectorized cable is a cable having a connector 14 at an end of the cable. As will be discussed in greater detail hereinafter, the present adapter block 10 is designed for use in multiple applications having different mounting or access configurations. For example, the adapter block 10 can be used in applications requiring a sliding mount or sliding access, and applications requiring a front mount or front access, and applications requiring a rear mount or rear access.

Figure 4:
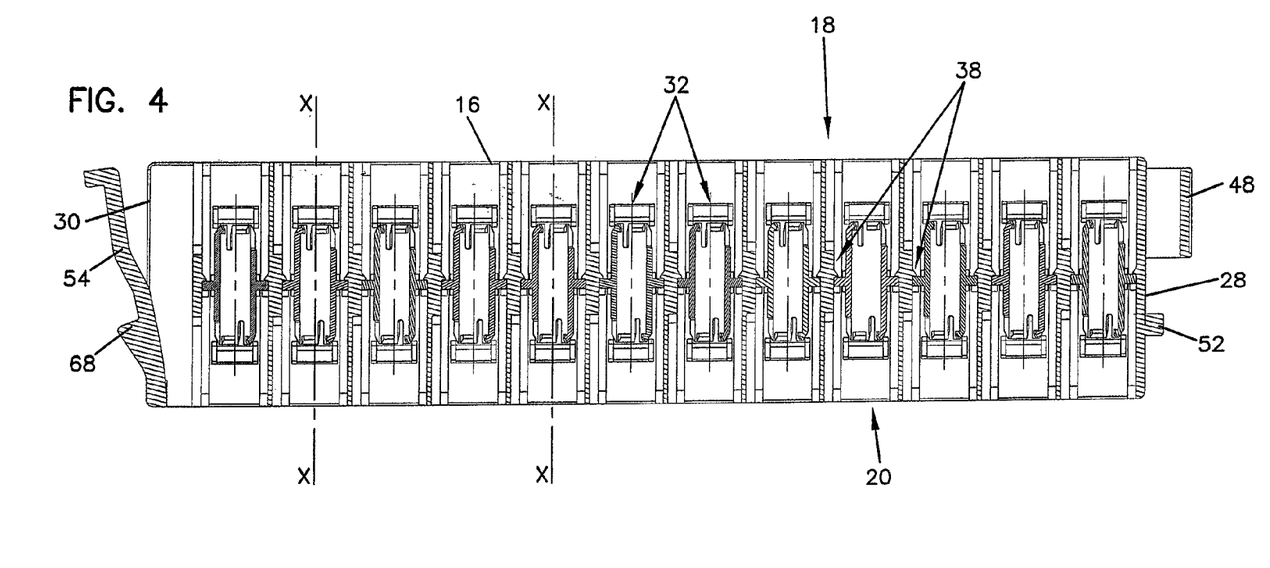
FIG. 4 is a top cross-sectional view of the adapter block of FIG. 3, taken along line 4-4.

The adapter block 10 of the present disclosure includes a one-piece housing 16 having a front 18 and a rear 20. The housing 16 defines a plurality of ports or openings 22 aligned in an array. A plurality of ports or openings is defined as more than two ports or openings. The openings 22 define locations at which connectorized cables are terminated. Each of the openings 22 defines a longitudinal axis X-X (see also FIG. 4). The longitudinal axes X-X of the openings are generally parallel to one another. The openings 22 extend from the front 18 of the housing to the rear 20.

The housing further includes a first side 24, a second side 26 opposite the first side, a first end 28, and a second end 30 opposite the first end. Each of the first and second sides 24, 26 and the first and second ends 28, 30 extends from the front 18 of the housing 16 to the rear 20.

Figure 2:
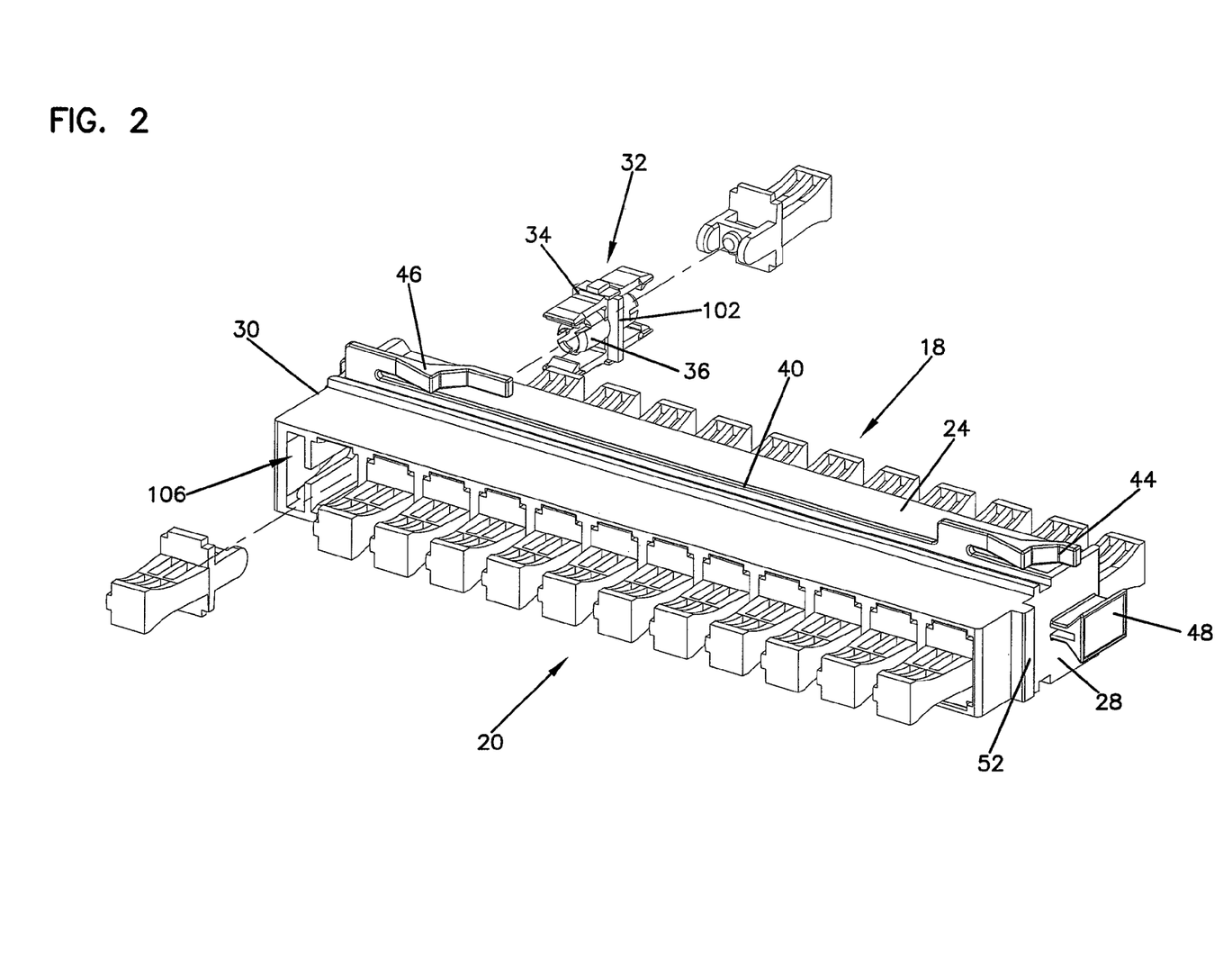
FIG. 2 is an exploded, front perspective view of the adapter block of FIG. 1, shown with dust caps.
Figure 3:
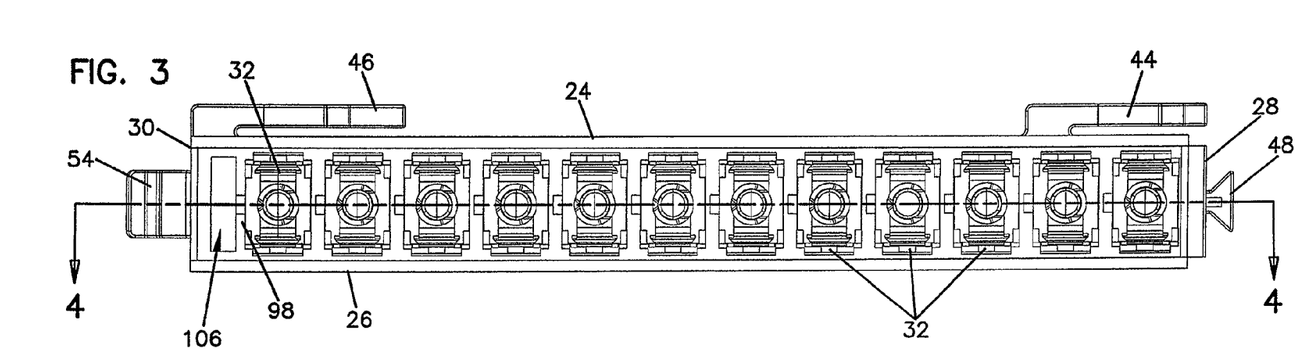
FIG. 3 is a front elevation view of the adapter block of FIG. 1.
Figure 5:
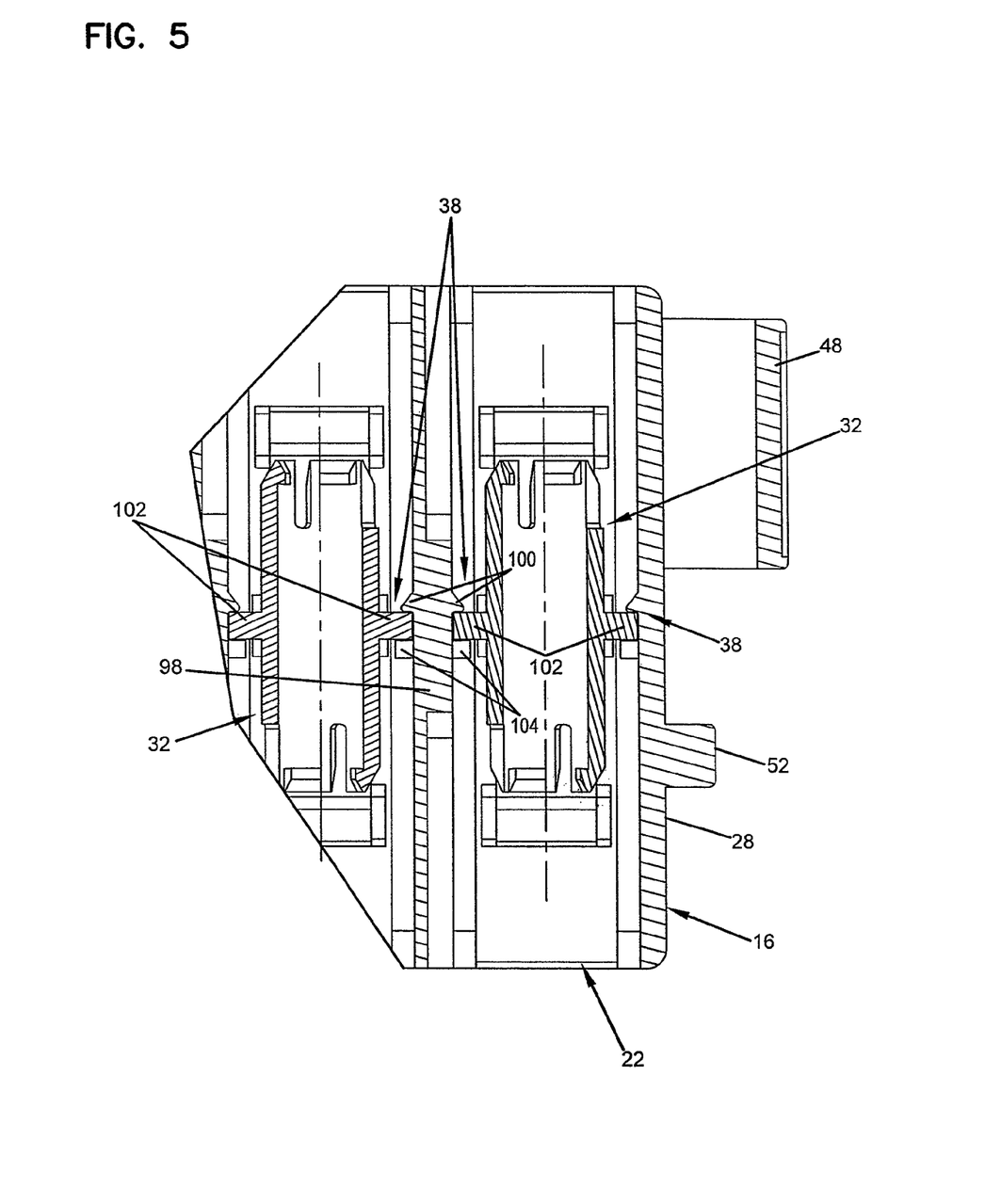
FIG. 5 is an enlarged detail view of a portion of the adapter block of FIG. 4.

Referring now to FIGS. 2 and 3, a fiber optic sleeve assembly 32 is mounted within each opening 22 of the housing 16. The sleeve assembly 32 includes a sleeve holder 34 and an alignment sleeve 36. The sleeve holder 34 holds the alignment sleeve 36. In the illustrated embodiment, the sleeve assembly 32 is inserted into the opening 22 of the housing 16 from the front 18. The sleeve holder 34 and housing 16 include a snap-fit connection 38 (FIGS. 4 and 5) that secures the sleeve assembly 32 within the housing opening 22.

In particular, the housing 16 includes inner dividing walls 98 (FIG. 5) having ramped projections 100. Shoulder members 102 of the sleeve holder 34 contact the ramped projections 100 during insertion into the opening 22. The contact between the shoulder member 102 and the projections 100 flex at least one of the inner dividing walls 98 outward until the shoulder member 102 snap-fits and seats between the ramped projection 100 and a stop element 104 formed in the opening 22. During assembly, the sleeve assemblies are sequentially loaded into the openings 22 from the first end 28 toward the second end 30. At the second end 30, the last dividing wall 98 is spaced from the second end 30 of the housing 16 (at 106 in FIGS. 3 and 4) to accommodate the wall's outward flexure during insertion of the last sleeve assembly 32.

In use, the alignment sleeve 36 aligns a fiber optic connector (e.g., 14) received in one opening 22 at the front 18 of the housing 16 with another fiber optic connector received in that same opening at the rear 20 of the housing. Details of other sleeve assembly and snap-fit connection constructions that can be used in the present adapter block embodiment are described in U.S. Publication No. 2006/0093274 and U.S. Publication No. 2007/0025675, which publications are incorporated herein by reference.

In the illustrated embodiment of FIGS. 1-4, the plurality of openings includes twelve openings 22. Other embodiment can include a lesser number of openings or a greater number of openings. The openings 22 are each constructed and sized to receive a cable connector (e.g., 14, FIG. 1). In the present embodiment, the openings define internal adapter structure that corresponds to external mating structure of an SC-type fiber optic connector. Further details of an SC-type fiber optic connector are described in U.S. Pat. No. 5,317,663, which patent is incorporated herein by reference. The sleeve holder 34 is similarly constructed to mate with an SC-type fiber optic connector. The opening and sleeve holder can be construction to mate with other types of connectors as well. In the illustration of FIG. 2, dust caps 50 are inserted within the openings 22 to protect the interior of each opening from contaminates.

The present adapter block 10 can be used in applications requiring a sliding mount, a front mount, and a rear mount. Referring to FIG. 2, each of the first side 24 and the second side 26 of the one-piece housing 16 defines a groove 40, 42 (see FIG. 6 for groove 42 on second side 26). The grooves 40, 42 extend from the first end 28 of the housing 16 to the second end 30 of the housing. The housing 16 further includes a first flexible locking arm 44 located at a first end 28 of the housing and a second flexible locking arm 46 located at the second end 30 of the housing (see also FIG. 3). Each of the flexible locking arms 44, 46 is positioned adjacent to the groove 40 on the first side 24 of the housing 16. A handle 48 (see also FIGS. 3 and 4) is located at the first end 28 of the housing 16. As will be discussed in greater detail hereinafter, the grooves 40, 42, the first and second flexible locking arms 44, 46, and the handle 48 work in conjunction with applications requiring a sliding mount. Each of the flexible locking arms 44, 46 and the handle 48 is integral with the one-piece housing.

Referring to FIGS. 2 and 3, pivoting structure 52, such as a lip or shoulder, is also located at the first end 28 of the housing 16 adjacent to the handle 48. A snap-in feature or flexible latch 54 is located at the second end 30 of the housing opposite that of the pivoting structure 52. As will be discussed in greater detail hereinafter, the pivoting structure 52 and the flexible latch 54 work in conjunction with applications requiring a front mount or a rear mount. Each of the flexible latch 54 and the pivoting structure 52 is integral with the housing 16.

Figure 6:
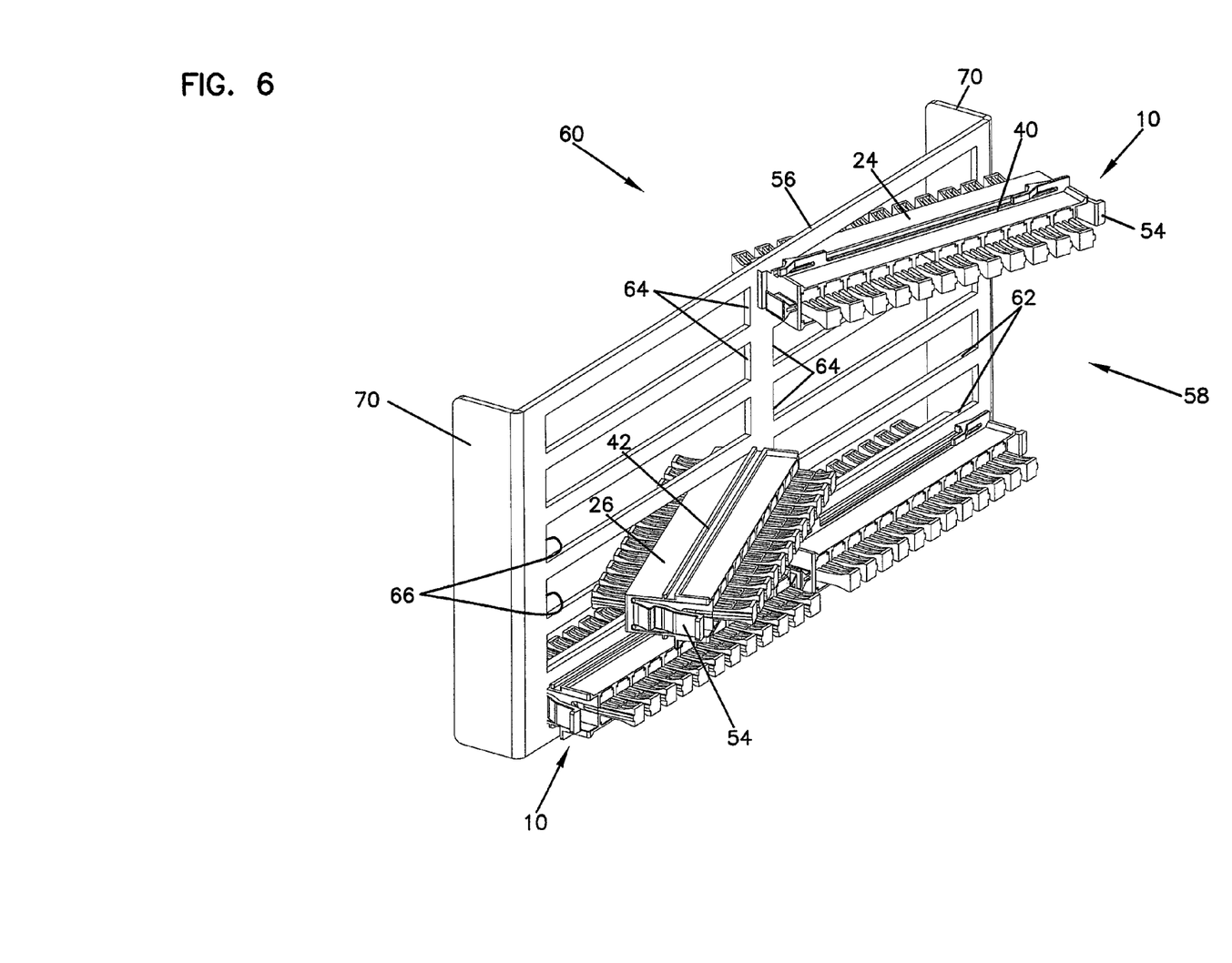
FIG. 6 is a front perspective view of one telecommunications panel embodiment having a first mounting configuration to which the adapter block of FIG. 1 mounts, the shown adapter blocks being mounted from the front of the panel.
Figure 7:
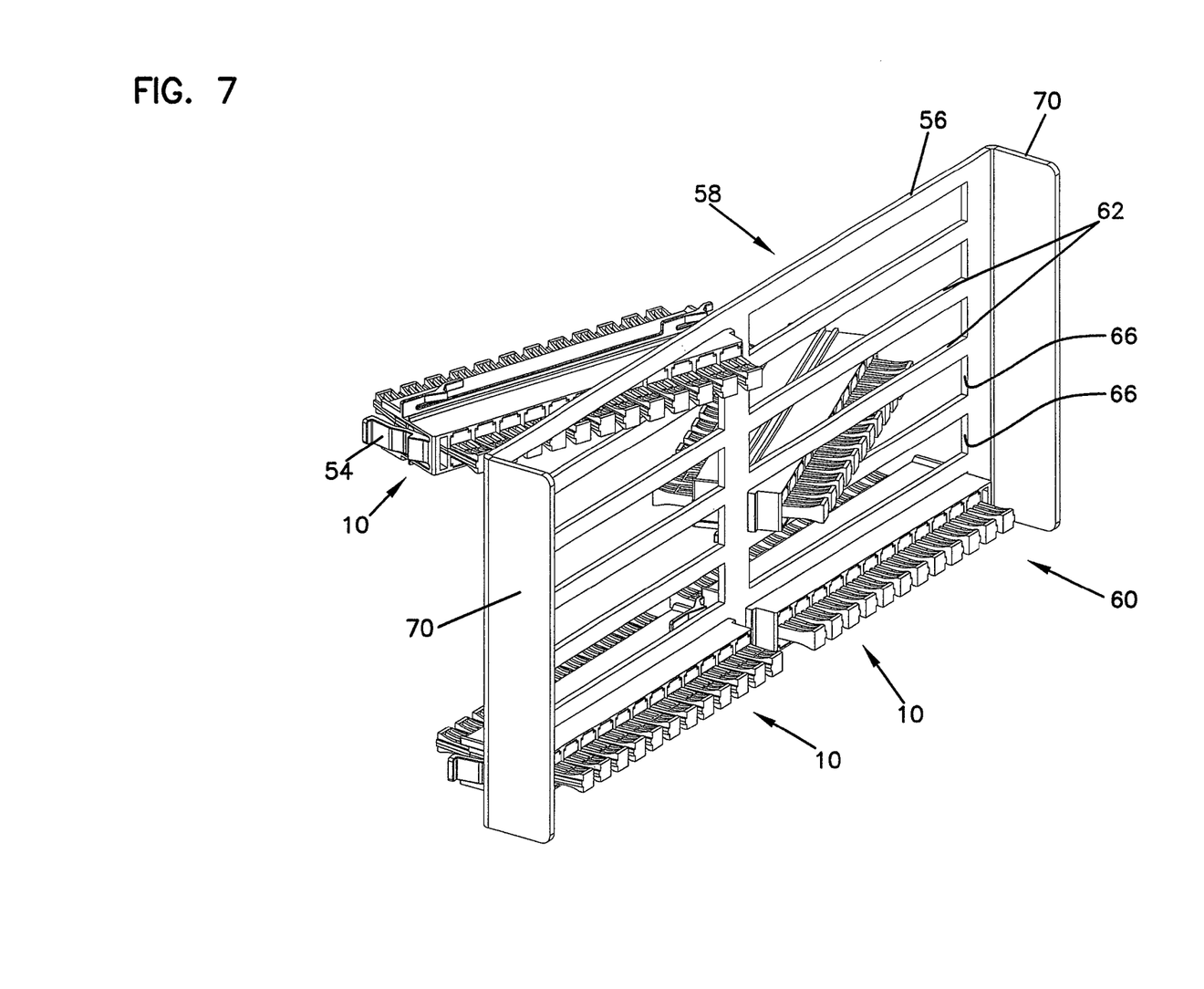
FIG. 7 is a rear perspective view of the telecommunications panel of FIG. 6.
Figure 8:
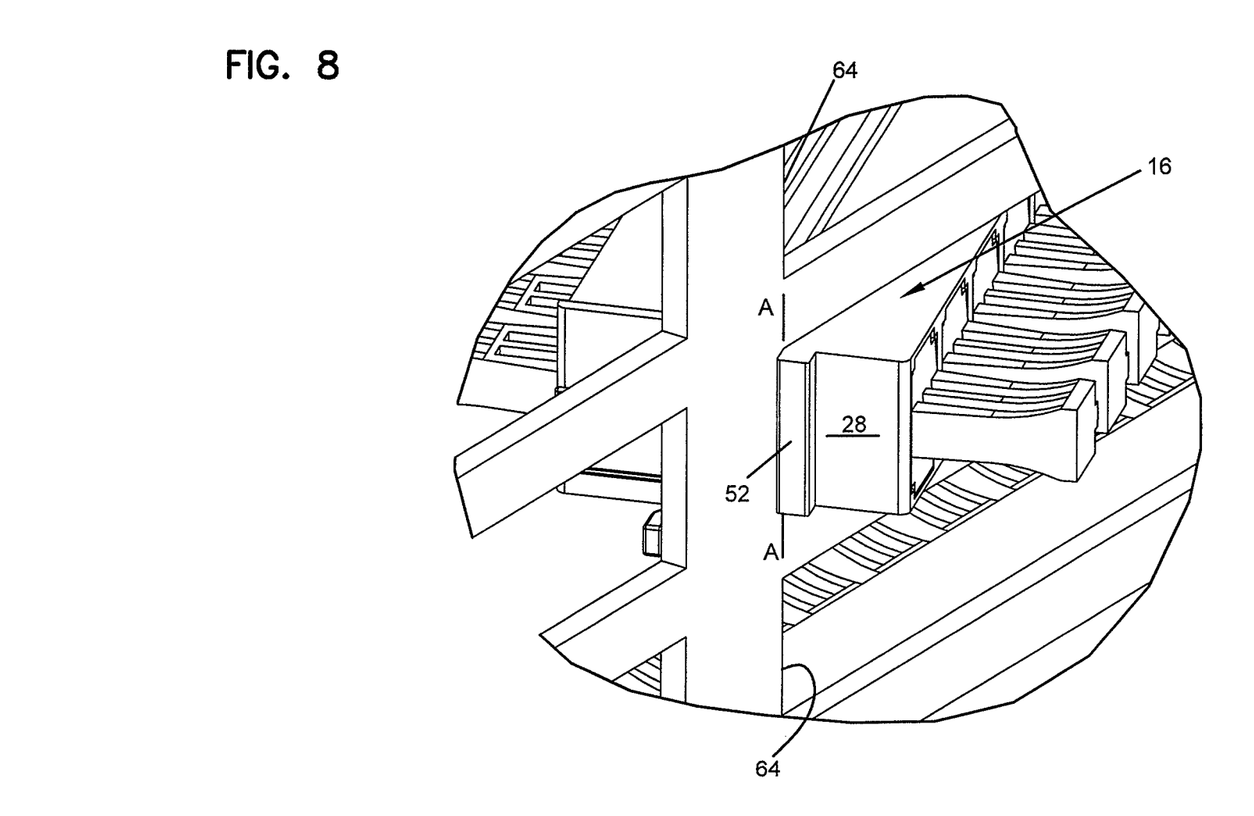
FIG. 8 is an enlarged detail view of a portion of the telecommunications panel and one adapter block of FIG. 7.

Referring now to FIGS. 6-8, a telecommunications panel 56 having a first block mounting configuration is illustrated. The telecommunications panel 56 has a front 58 and a rear 60. Mounting flanges 70 are located along each side of the panel. The first block mounting configuration includes closed apertures 62 formed in the panel. What is meant by a "closed" aperture is an aperture having a perimeter formed entirely within the panel material (i.e., circumscribed by panel material), as opposed to an open-sided aperture (e.g., as opposed to the open-ended slot 82 of FIG. 11). In the illustrated embodiment, the closed apertures are rectangular in shape.

The adapter block 10 of FIGS. 1-4 is configured to mount within the closed apertures 62 of the panel 56. In FIGS. 6 and 7, two adapter blocks are shown mounted, two other adapter blocks are in the process of being mounted from the front 58 of the panel 56. To front mount an adapter block 10 to the panel 56, the pivoting structure 52 at the first end 28 of the housing 16 is engaged with a first vertical edge 64 of the closed aperture 62 (see FIG. 8). The adapter block 10 is then pivoted about a pivot axis A-A defined generally by the first edge 64 of the panel and the pivoting structure 52 of the block. As the adapter block 10 is pivoted into the closed aperture 62, the flexible latch 54 engages a second vertical edge 66 of the closed aperture 62. The flexible latch 54 includes a ramped shoulder 68 (FIG. 4) that deflects that latch 54 inward during insertion into the aperture 62. Upon full insertion, the latch 54 provides a snap-fit connection that secures the adapter block 10 relative to the panel 56.

In the seated or snap-fit position, the flexible latches 54 of the front-mounted adapter blocks 10 are accessible at the outer sides of the panel 56. In the alternative, the adapter blocks can be front mounted in a flipped orientation by engaging the pivoting structure 52 with the second vertical edge 66 of the closed aperture and pivoting the block into a seated or snap-fit position. In this flipped orientation, the flexible latches 54 would be located toward the center of the panel.

The pivoting structure 52 and the flexible latch 54 securely mount the adapter block to the front-mount panel while still providing selective access to cable terminations of the adapter block. For example, a selected adapter block can be access and/or removed by flexing the corresponding latch 54 inward and pivoting the selected block out from the aperture about the pivot axis.

Figure 9:
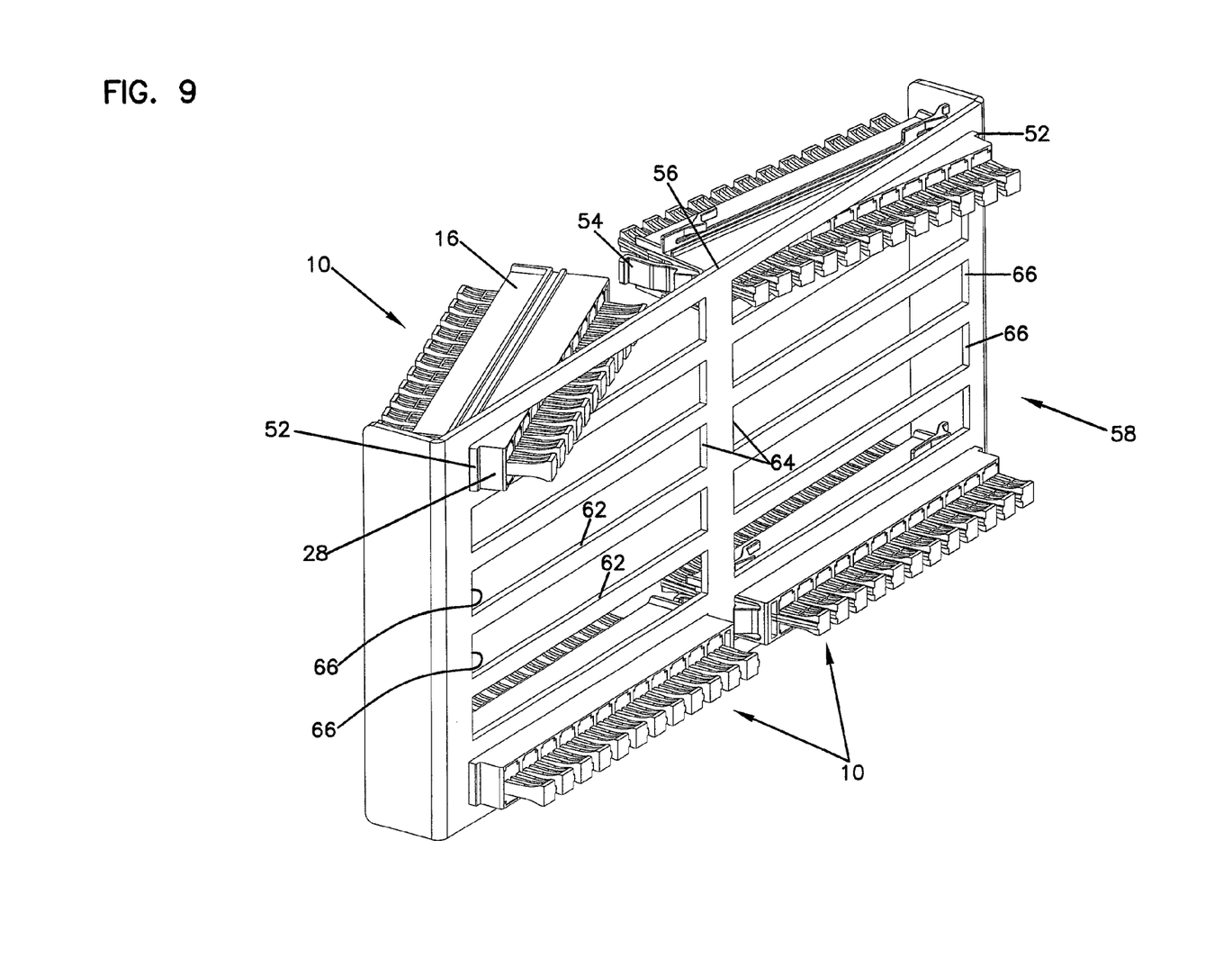
FIG. 9 is a front perspective view of the telecommunications panel having the first mounting configuration of FIG. 6, to which the adapter block of FIG. 1 mounts, the shown adapter blocks being mounted from the rear of the panel.
Figure 10:
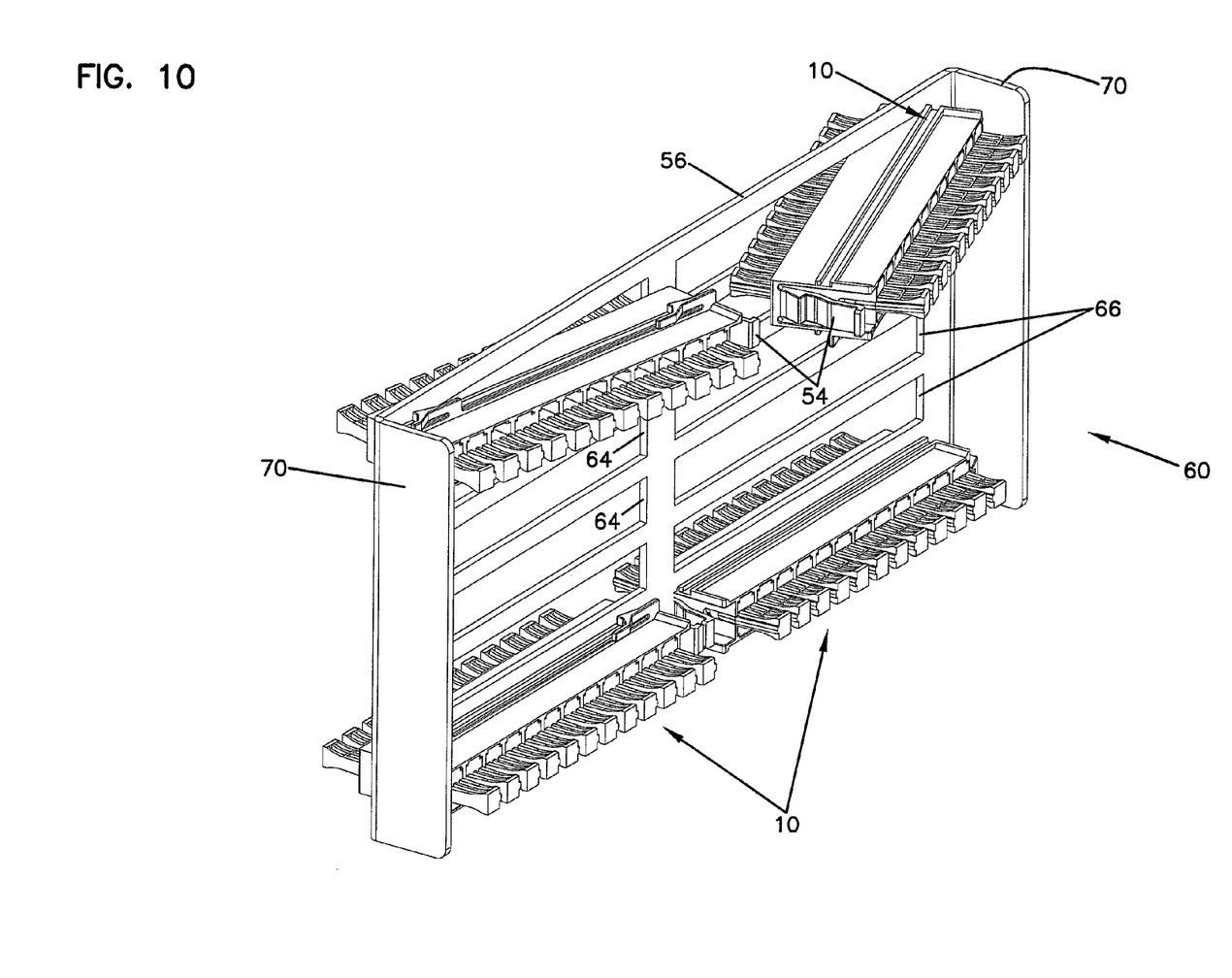
FIG. 10 is a rear perspective view of the telecommunications panel of FIG. 9.

Referring to FIGS. 9 and 10, the adapter blocks 10 can also be mounted from the rear 60 of the panel 56 in applications requiring rear mount. Similar to the previous mounting method, to rear mount an adapter block, the pivoting structure 52 at the first end 28 of the housing 16 is engaged with the second vertical edge 66 of the closed aperture 62. The adapter block 10 is then pivoted about a pivot axis defined generally by the second edge 66 of the panel and the pivoting structure 52 of the block. As the adapter block 10 is pivoted into the closed aperture 62, the flexible latch 54 engages the first vertical edge 64 of the closed aperture 62, and provides a snap-fit connection that secures the adapter block 10 relative to the panel 56.

In the seated or snap-fit position, the flexible latches 54 of the rear-mounted adapter blocks 10 are accessible at the center of the panel 56. In the alternative, the adapter blocks can be rear mounted in a flipped orientation by engaging the pivoting structure 52 with the first vertical edge 64 of the closed aperture 62 and pivoting the block into a seated or snap-fit position. In this flipped orientation, the flexible latches 54 would be located adjacent to the mounting flanges 70.

The pivoting structure 52 and the flexible latch 54 securely mount the adapter block to the rear-mount panel, as well as to front-mount panels, while still providing selective access to cable terminations of the adapter block in each panel application.

Figure 11:
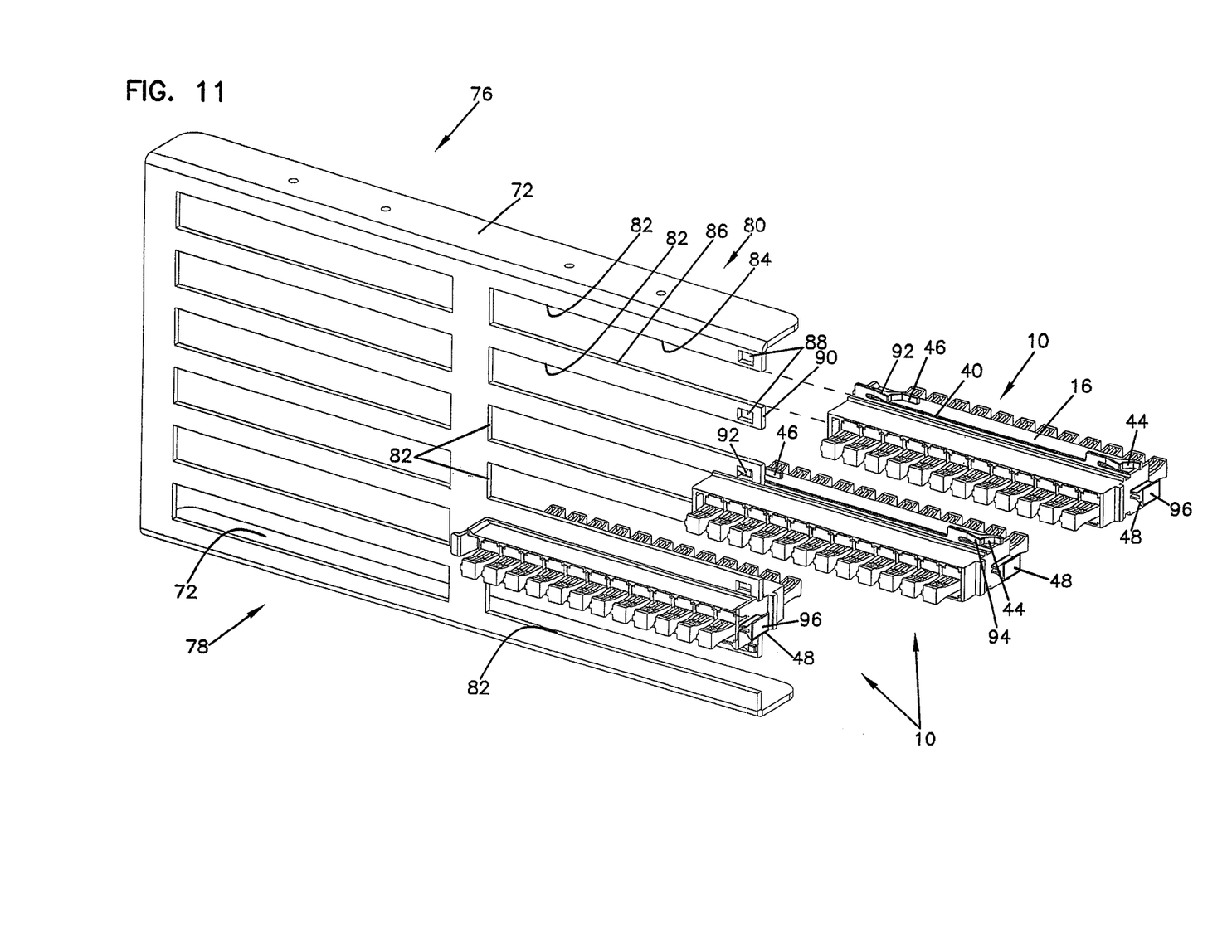
FIG. 11 is a front perspective view of another telecommunications panel embodiment having a second mounting configuration to which the adapter block of FIG. 1 mounts.

Referring now to FIG. 11, a telecommunications panel 76 having a second block mounting configuration is illustrated. The telecommunications panel 76 has a front 78 and a rear 80. Mounting flanges 72 are located along the top and bottom of the panel. The second block mounting configuration includes open-ended slots 82 formed in the panel. What is meant by an "open-ended" slot is a slot or aperture having a perimeter that is not entirely within or circumscribed by panel material.

The adapter block 10 of FIGS. 1-4 is configured to slide mount within the open-ended slots 82 of the panel 76. In FIG. 11, two adapter blocks are shown mounted (the lower two adapter blocks), and one adapter block (the upper adapter block) is in the process of being mounted. To slide mount the adapter block 10 to the panel 76, opposing horizontal edges 84, 86 of the slot 82 are positioned within the grooves 40, 42 (see FIG. 6) of the adapter block housing 16. The adapter block 10 is then slid inward into the slot 82. The adapter block 10 slides relative to the panel 76 along a line of travel that is perpendicular to the longitudinal axes X-X (FIGS. 3 and 4) of the openings 22 of the one-piece housing 16.

Still referring to FIG. 11, the telecommunications panel 76 includes holes 88 located adjacent to an outer edge 90 of the panel. As the block 10 is sliding inward, a ramped surface 92 of the second flexible arm 46 engages the outer edge 90 of the panel 76 causing the second flexible arm to flex in the rearward direction; the arm 46 then engages or seats within the hole 88. As the block is further slid inward, the ramped surface 92 of the second flexible arm 46 causes the arm to disengage from the hole 88 and flex outward in the rearward direction. A ramped surface 94 of the first flexible arm 44 then contacts the panel to flex the first flexible arm 44 in the rearward direction, the arm 44 then engages or seats within the hole 88. The hole 88 and the first flexible arm 44 provide a snap-fit connection that secures the adapter block 10 relative to the panel 76.

When the first flexible arm 44 of the block 10 seats within the hole 88, the adapter block is retained within an inward, secured position, but can be selectively released and moved to an outward, secured position. In particular, the first flexible arm 44 and be flexed outward to disengage from the hole 88. The adapter block 10 can then be pulled outward until the second flexible arm 46 engages the hole 88. The second flexible arm 46 prevents the adapter block 10 from inadvertently separating from the panel 76. In this outward, secured position, cable/connector terminations can be accessed. As can be understood, the hole 88 and the second flexible arm 46 also provide a snap-fit connection that secures the adapter block relative to the panel in the outward, secured position.

To slide the adapter block 10 back to the inward position, the block is pushed inward such that the ramped surface 92 of the second flexible arm automatically flexes the arm outward by the inward sliding movement of the block. In the alternative, to slide the block 10 completely out of the slot 82, the second flexible arm 46 can be flexed outward to disengage from the hole 88. The adapter block 10 can then be removed from the panel 76.

Still referring to FIG. 11, the handle 48 of the adapter block 10 is located at open end of the open-ended slot 82. The handle 48 can be used to slide the block in and out of the slot 82, and to slide the block between the inward and outward secured positions. The illustrated handle 48 includes a face surface 96 that faces outward from the panel 76 when mounted within the open-ended slot 82. Indicia or designation labels can be attached to the face surface 96 to provide information that is visible from the side of the panel 76.

The grooves 40, 42 and the flexible arms 44, 46 securely mount the adapter block 10 to the slide-mount panel, as well as to front-mount panels and rear-mount panels, while still providing selective access to cable terminations of the adapter block in each panel application.

A previously described, the present adapter block can include a greater or lesser number of openings 22 to accommodate a particular application. Referring now to FIGS. 12-16, a second embodiment of a multi-port adapter block 110 is illustrated. The second adapter block embodiment 110 has the same features as previously described with respect to the first embodiment, except that the adapter block 110 has six openings 122 aligned in an array instead of twelve.

Figure 12:
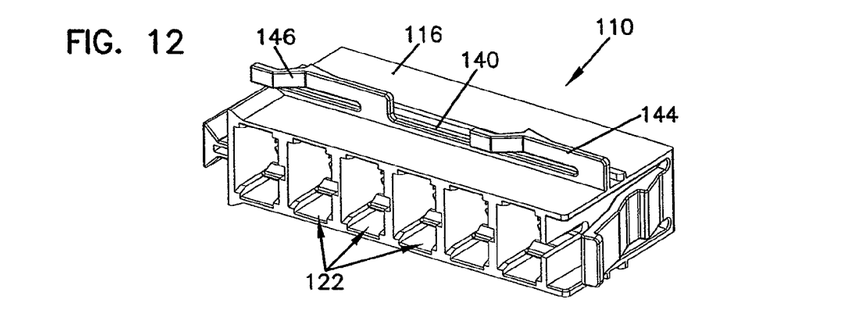
FIG. 12 is a front perspective view of another embodiment of a multi-port adapter block, in accordance with the principles disclosed.
Figure 13:
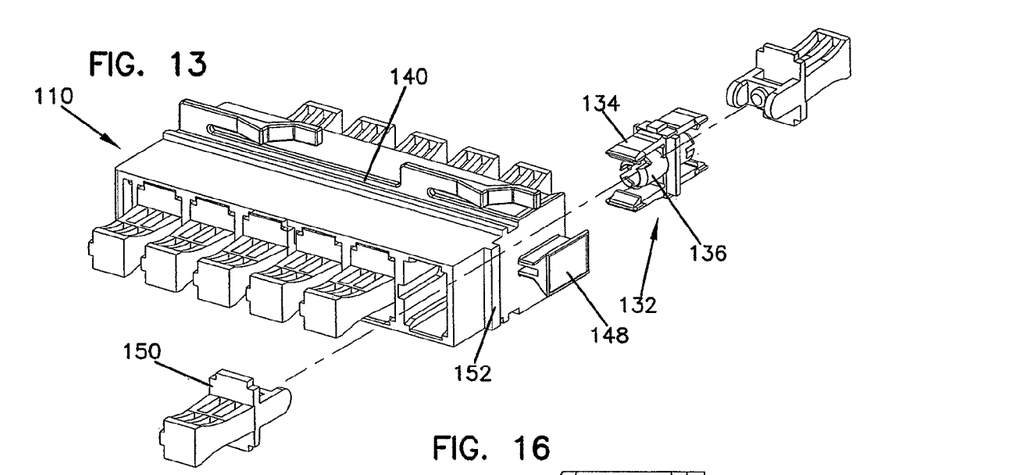
FIG. 13 is an exploded, front perspective view of the adapter block of FIG. 12, shown with dust caps.
Figure 14:
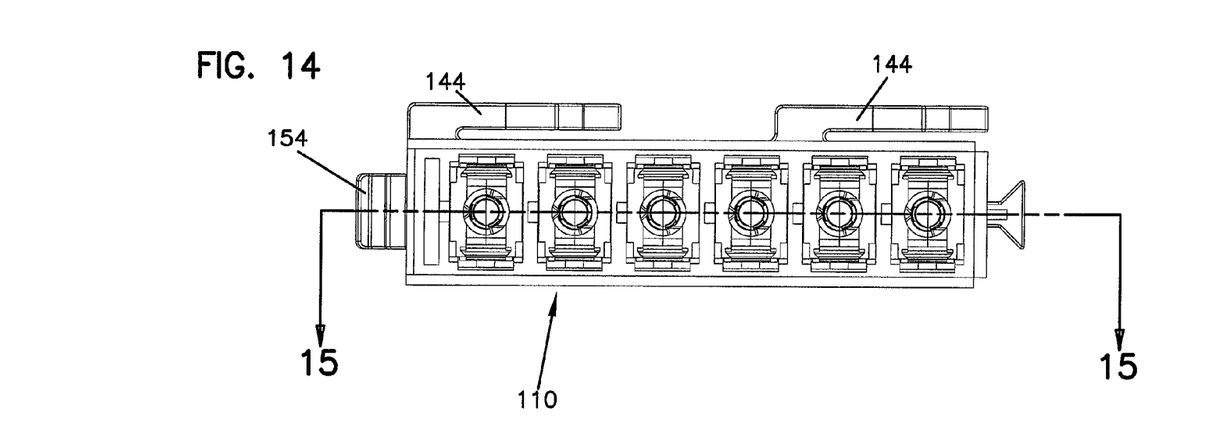
FIG. 14 is a front elevation view of the adapter block of FIG. 12.

For example and referring to FIG. 12, similar to the previous embodiment, the adapter block 110 is arranged to provide interconnection between two connectorized fiber optic cables. The adapter block 110 includes a one-piece housing 116 that defines the plurality of ports or openings 122 aligned in the array. Sleeve assemblies 132 (FIG. 13) are mounted within each one of the openings 122. As previously described, the sleeve assemblies each 132 include a sleeve holder 134 and an alignment sleeve 136. The sleeve holder 134 holds the alignment sleeve 136 and is secured within the opening 122 of the housing by a snap-fit connection 138 (FIGS. 15 and 16).

Also as previously described, the openings 122 are each constructed and sized to receive a cable connector (e.g., 14, FIG. 1), such as an SC-type fiber optic connector. In the illustrated embodiment of FIG. 13, dust caps 150 are inserted within the openings 122 to protect the interior of each opening from contaminates. The adapter block 110 further includes a handle 148, first and second flexible locking arms 144, 146, and grooves (e.g., 140) formed in the housing 116. The grooves (e.g., 140), the first and second flexible locking arms 144, 146, and the handle 148 work in conjunction with applications requiring a sliding mount, such as a panel having an open-ended slot sized to correspond to the length of the adapter block 110 with six openings 122.

Figure 15:
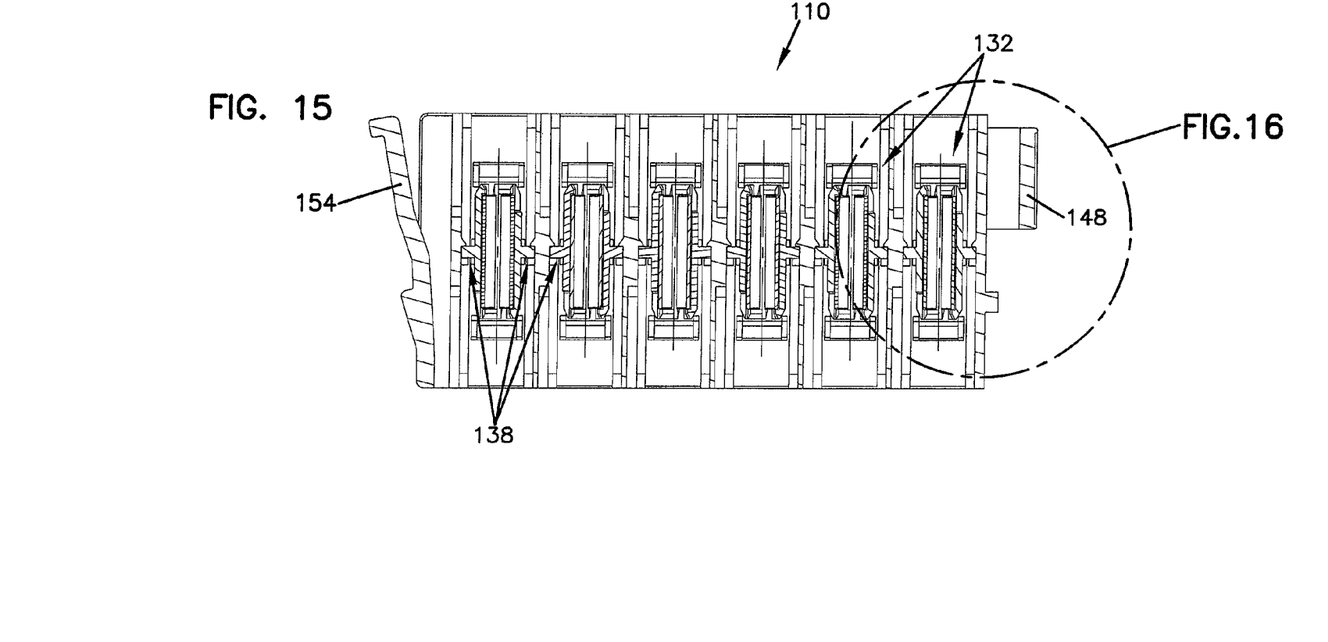
FIG. 15 is a top cross-sectional view of the adapter block of FIG. 14, taken along line 15-15.
Figure 16:
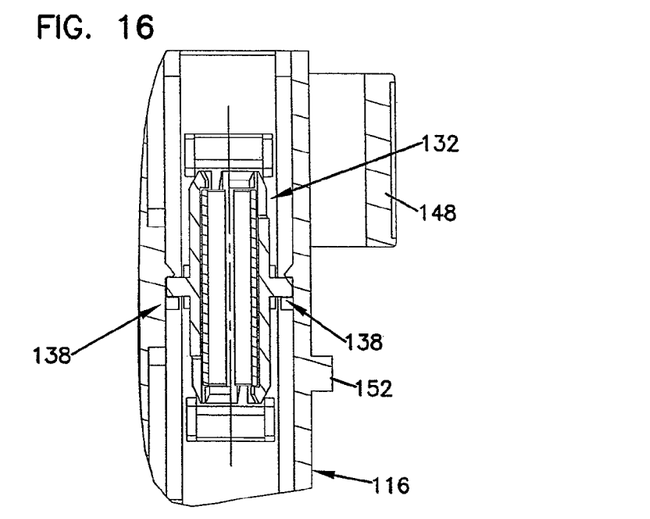
FIG. 16 is an enlarged detail view of a portion of the adapter block of FIG. 15.

In addition, the adapter block 110 includes pivoting structure 152 (FIG. 13) and a flexible latch 154 (FIG. 15). The pivoting structure 152 and the flexible latch 154 work in conjunction with applications requiring a front mount or a rear mount, such as a panel having a closed aperture sized to correspond to the length of the adapter block 110.

The above specification provides a complete description of the present invention. Since many embodiments of the invention can be made without departing from the spirit and scope of the invention, certain aspects of the invention reside in the claims hereinafter appended.

What is claimed is:

1. An adapter block, comprising:
   a) a one-piece housing having a front and a rear, the housing defining a plurality of openings that extend from the front to the rear, the openings being aligned in an array, the housing further having first and second opposing sides and first and second opposing ends, each of the first side, the second side, the first end, and the second end extending from the front of the housing to the rear, the first and second sides of the housing each defining a groove that extends from the first end to the second end of the housing;

b) a sleeve assembly mounted within each opening of the housing, the sleeve assembly including a sleeve that aligns one fiber optic connector received in one opening at the front of the housing with another fiber optic connector received in the one opening at the rear of the housing;

c) first and second flexible locking arms that are separate from the sleeve assembly, each flexible locking arm being integrally provided as part of the one-piece housing adjacent to one of the grooves of the housing;

d) a handle located at one of the first and second ends of the housing; and e) a flexible latch located at one of the first and second ends of the housing opposite the handle.

2. The adapter block of claim 1, wherein the sleeve assemblies are mounted within the openings of the housing by a snap-fit connection.

3. The adapter block of claim 1, wherein each opening defines internal adapter structure that corresponds to external mating structure of an SC-type fiber optic connector.

4. The adapter block of claim 1, wherein the plurality of openings includes six openings aligned in the array.

5. The adapter block of claim 1, wherein the plurality of openings includes twelve openings aligned in the array.

6. The adapter block of claim 1, wherein the first and second flexible locking arms are each integrally provided adjacent to the same groove.

7. An adapter block, comprising:

a) a one-piece housing having a front and a rear, the housing defining a plurality of openings that extend from the front to the rear, the openings being aligned in an array, the housing further having first and second opposing sides and first and second opposing ends, each of the first side, the second side, the first end, and the second end extending from the front of the housing to the rear, the first and second sides of the housing each defining a groove that extends from the first end to the second end of the housing;

b) a sleeve assembly mounted within each opening of the housing, the sleeve assembly including a sleeve that aligns one fiber optic connector received in one opening at the front of the housing with another fiber optic connector received in the one opening at the rear of the housing;

c) first and second flexible locking arms that are separate from the sleeve assembly, each flexible locking arm being integrally provided as part of the one-piece housing adjacent to the same one of the grooves of the housing; and d) a handle located at one of the first and second ends of the housing.

8. The adapter block of claim 7, wherein the first and second flexible locking arms snap-fit the adapter block in first and second secured positions respectively when the adapter block is slidingly mounted to a panel.

9. The adapter block of claim 7, wherein the sleeve assemblies are mounted within the openings of the housing by a snap-fit connection.

10. The adapter block of claim 7, wherein each opening defines internal adapter structure that corresponds to external mating structure of an SC-type fiber optic connector.

11. The adapter block of claim 7, wherein the plurality of openings includes six openings aligned in the array.

12. The adapter block of claim 7, wherein the plurality of openings includes twelve openings aligned in the array.

13. The adapter block of claim 7, further including a flexible latch located at one of the first and second ends of the housing opposite the handle.

* * * * *